May 19, 1959     H. C. LOWELL     2,887,670
WIRE TERMINATION DEVICE
Filed March 5, 1956
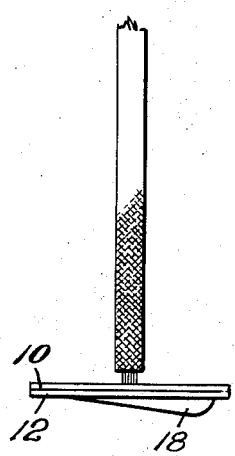
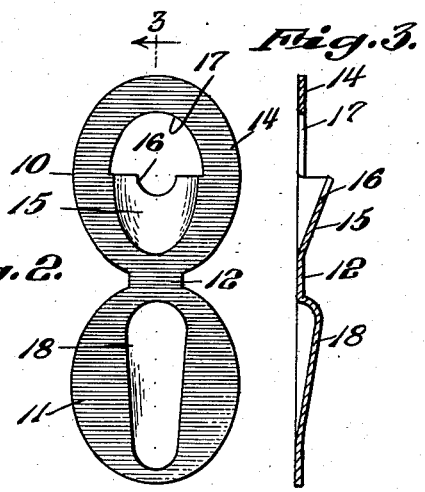
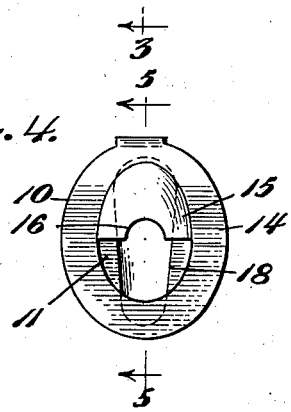
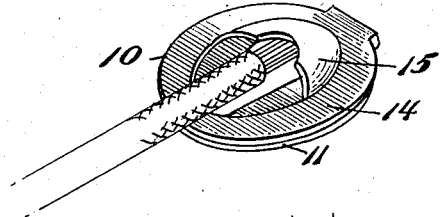
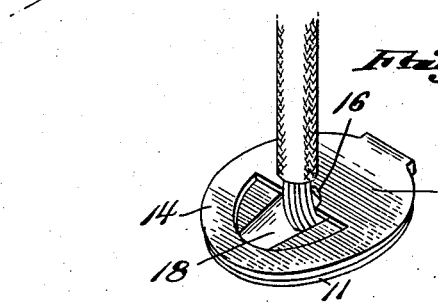
INVENTOR.
Howard C. Lowell
BY
Barlow & Barlow
ATTORNEYS.

United States Patent Office 2,887,670
Patented May 19, 1959

2,887,670
WIRE TERMINATION DEVICE

Howard C. Lowell, East Providence, R.I., assignor to Patton-MacGuyer Co., a corporation of Rhode Island Application March 5, 1956, Serial No. 569,558

1 Claim. (Cl. 339—275)

This invention relates to a wire termination device of the disk type which is particularly suitable for providing the wire termination and connection to the foils in a capacitor.

It is an object of this invention to provide a simple improved wire termination device which readily adapts itself to assembly line production methods.

It is a further object of the invention to provide a termination device which will have a portion adapted to receive the end of a conductor and which will form a mechanical as well as electrical joint.

With these and other objects in view, the invention consists of certain novel features of construction as will be more fully described and particularly pointed out in the appended claim.

In the accompanying drawings:

Figure 1 is an elevational view of the wire termination device affixed to the end of a wire;

Figure 2 is a plan view of the termination device in flat form;

Figure 3 is a sectional view taken on line 3—3 of Figure 2;

Figure 4 is a top view of the wire termination device in finished form;

Figure 5 is a sectional view taken on line 5—5 of Figure 4;

Figures 6 and 7 are perspective views of the wire termination device, showing a wire in the successive steps of being inserted therein and secured thereto.

In capacitor pigtail construction it is important in certain applications that a rather good seal be presented between the casing of the capacitor and the wire pigtail that emerges therefrom. In the prior art it has been customary to pierce a generally circular plate and insert through this opening a bared end of a wire pigtail. This pigtail end was subsequently bent over to be in the plane of the plate and soldered thereto so as to form a bulbous protrusion that would be useful in contacting the foil of the capacitor. It will be apparent that with such a structure the only means that is mechanically holding the pigtail to the plate resides in the strength of the solder joint that has been made. Also it will be apparent that without care it would be rather easy to form a poor joint and not completely fill the hole in the plate with solder. This latter defect would allow the entry of moisture and dirt to the interior of the capacitor structure with the usual end seals that are employed and therefore produced a product which was not entirely suitable for all applications.

In proceeding with this invention, therefore, I have provided a termination plate consisting of two members, namely, a flap member and a first member, the flap member being adapted to be folded over the first member in overlapping relation. Additionally, I form the first member with an integral dome portion in quadrature so that the entry of a wire thereunder is facilitated, the flap member serving as a seal or backing for the first member and the dome portion.

With reference to the drawings, the wire termination device consists of a first generally circular member 10 and a complemental circular or flap member 11. These are joined together by a bridge 12. The first member 10 consists of a rim 14 with a raised or dome-like portion 15 extending therefrom. This dome-like portion is formed in quadrature, as can be more readily seen in Figure 6, and is provided with a semi-circular recess 16 on the free edge thereof. It will be apparent, therefore, that this first member 10 by reason of this structure provides a cut-out portion 17.

The flap member 11 is also generally circular in shape and is adapted to be complemental to the first member 10 by lying in abutting relationship to one face thereof. Preferably this flap member is provided with a protrusion 18 which serves a twofold purpose. By reference to Figures 4 and 5, it will be noted that the protrusion 18 forms a cup-like recess underneath the dome portion 15. This, therefore, allows the easy entry of a wire which is to be joined thereto and also provides a finite area for the capture of the end of the wire upon subsequent attachment.

In fabricating these terminals, it is desirable that they be tinned. If the tinning is accomplished in the normal manner as by dipping, it will be found that when the items are tinner in the finished or folded-over position shown in Figures 4–7, the cup formed by the protrusion 18 will tend to collect an excessive amount of solder which may prevent the entry of a wire therein. However, by judicious shaking of the element immediately after the removal thereof from the solder bath and/or by the use of a brush which will sweep across the cut-out portion 17, this excess solder may be removed. After the tinning operation, the terminal may be assembled to the end of an insulated conductor, which has been bared at one end thereof, by placing the bared end of the conductor underneath the dome portion 15 and into the recess formed by the protrusion 18. This operation is illustrated in Figure 7. By the application to the dome of pressure through a heated die or by other means, the dome portion 15 is simultaneously compressed as the terminal is heated to effect a mechanical as well as a soldered joint between the device and the end of the wire. This step is illustrated particularly in Figure 7 wherein it will be noted that the dome portion 15 is entirely absent, it being replaced by a substantially flat surface 15a. The wire may then be bent up at right angles to the terminal so that it is engaged in the recess 16, or this operation may be accomplished simultaneously with the crimping of the dome 15.

It will therefore be seen that I have provided a rather simple wire termination device which will provide a mechanical as well as an electrical joint to the end of the wire and which also will provide an integral circular portion around the end of the wire at all times.

I claim:

A wire termination device comprising a first member having an integral dome portion, said dome portion being in quadrature to provide an edge free of said member and generally transverse thereof so that an opening is provided thereunder, an integrally formed flap member attached to said first member at an edge thereof, said members adapted to be bent upon themselves in abutting relationship so that said flap member forms a wall under said dome portion, said flap member being provided with a protrusion, said protrusion forming a well under said dome portion when said members are in overlapping relation.

References Cited in the file of this patent
UNITED STATES PATENTS

| | | |
|---|---|---|
| 379,598 | Otto | Mar. 20, 1888 |
| 2,406,079 | Krueger | Aug. 20, 1946 |
| 2,615,950 | Lamb | Oct. 28, 1952 |